Figure 1:
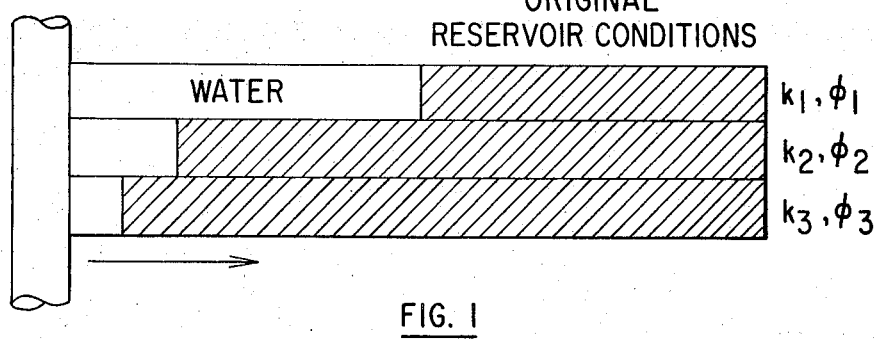

United States Patent [19]
Dauben

[11] 3,866,680
[45] Feb. 18, 1975

[54] MISCIBLE FLOOD PROCESS
[75] Inventor: Dwight L. Dauben, Tulsa, Okla.
[73] Assignee: Amoco Production Company, Tulsa, Okla.
[22] Filed: July 9, 1973
[21] Appl. No.: 377,879

[52] U.S. Cl. ............................. 166/273, 166/274
[51] Int. Cl. ............................................ E21b 43/22
[58] Field of Search .......... 166/252, 273, 274, 269, 166/266

[56] References Cited
UNITED STATES PATENTS

| | | | |
|---|---|---|---|
| 3,157,230 | 11/1964 | Connally, Jr. et al. | 166/274 |
| 3,208,517 | 9/1965 | Binder, Jr. et al. | 166/274 |
| 3,294,164 | 12/1966 | Hardy et al. | 166/274 |
| 3,472,319 | 10/1969 | McAuliffe | 166/273 X |
| 3,586,107 | 6/1971 | Parrish | 166/273 |
| 3,667,545 | 6/1972 | Knight | 166/273 X |

Primary Examiner—Stephen J. Novosad
Attorney, Agent, or Firm—Arthur McIlroy; Paul F. Hawley

[57] ABSTRACT

Sweep efficiency in a miscible flood is improved by injecting a macro emulsion into the formation which tends to flow into the zones of greatest permeability. Following this, the solvent to be used in the flooding step is introduced, and under the conditions now existing in the formation the solvent is found to flow into the less permeable oil-bearing zones.

The present invention relates to the recovery of oil from underground deposits thereof involving the use of a solvent fluid-drive system. More particularly, it is concerned with an improved miscible flooding method in formations where such procedures are normally complicated owing to reservoir heterogeneity.

6 Claims, 3 Drawing Figures

INJECTION OF MISCIBLE FLUID AFTER EMULSION $k_1 > k_2 > k_3$          $k$ = PERMEABILITY
$\phi_1 > \phi_2 > \phi_3$          $\phi$ = POROSITY

INJECTION OF WATER

INJECTION OF EMULSION
PREFERENTIAL ENTRY INTO MOST PERMEABLE ZONE

INJECTION OF MISCIBLE FLUID AFTER EMULSION $k_1 > k_2 > k_3$    k = PERMEABILITY
$\phi_1 > \phi_2 > \phi_3$    $\phi$ = POROSITY

MISCIBLE FLOOD PROCESS

BACKGROUND OF THE INVENTION

Miscible flooding processes currently being employed in the field involve the use of enriched gas (Crump U.S. Pat. No. 2,880,801), $CO_2$, micellar solutions and propane (Morse U.S. Pat. No. 3,354,953). These processes can generally recover all of the oil in the area contacted by the injected fluids. In many tests of these processes in the field, however, oil recovery has been poor due to the premature breakthrough of fluids. The poor sweep efficiency can result from the unfavorable mobility ratio between the driving and driven phases, and reservoir heterogeneity. Recent developments have resulted in improvements in the mobility ratio. For example, the alternate injection of water with gas and/or enriched gas can reduce the mobility of fluids as taught in Dyes U.S. Pat. No. 3,096,821. In the case of micellar fluids, mobility control can be obtained by the use of a slug of dissolved polymer behind the micellar solvent as described in Coppel U.S. Pat. No. 3,261,399.

While the art in its presently developed state provides miscible flooding techniques capable of securing increased recovery of crude oil, problems still exist with such procedures when severe reservoir heterogeneity is encountered.

SUMMARY OF THE INVENTION

Briefly, the process of my invention involves first injecting a suitable emulsion into an oil-bearing formation. The emulsion has the ability to propagate deep into the formation and to reduce the permeability of that part of the reservoir contacted. Suitable emulsions for this purpose are described in the *Journal of Petroleum Technology*, Vol. 25, Pages 721 to 733. The emulsion enters the more permeable zones and thus permits the subsequently injected fluids to be directed to the less permeable sections of the formation.

Following the emulsion, a solvent such as employed in any of the various kinds of miscible flooding procedures is introduced, such as, for example, enriched gas, $CO_2$, propane, or a micellar slug. The micellar slug or surfactant solution can be driven through the formation by means of water or by the use of a mobility control slug of polymer water followed by water. If solvents such as propane, enriched gas, or $CO_2$ are used, then they are preferably forced through the reservoir by gas or alternate slugs of gas and water.

In order for an emulsion to be effective in improving sweep efficiency and ultimate oil recovery, it should be placed in the more permeable zones. Emulsions of the type contemplated herein followed by miscible fluids have this capability as a result of two mechanisms.

1. The emulsion preferentially enters the zones of greater permeability by controlling the size of the dispersed phase droplets. The droplet size should be small enough to enter the pore space of the highly permeable sections, but too large to permit substantial entry into the tighter zones. However, some of the emulsion does usually enter the smaller diameter pore sections. This effect can be at least partially overcome in the following manner.

2. High sweep efficiency is achieved as the miscible fluids displace the emulsion in the smaller pore, less permeable sections. The miscible fluid will displace the emulsion as well as the native-oil saturation. The blocking action of the emulsion is greatly reduced by dilution through mixing with the solvent and by solubilization of the dispersed phase oil droplets into the solvent. The emulsion may be largely removed from the smaller pore, low permeability layers through these mechanisms, whereas a substantial amount of emulsion may yet remain in the more permeable layers. This permits a greater portion of the injected fluids to enter the smaller pore, less permeable sections. Any emulsion going into the tighter portion of the formation is forced ahead and becomes a part of the oil bank being produced. Maximum benefit, of course, is obtained in cases where only the more permeable zone contains the emulsion.

Control of the dispersed phase droplet size is desirable for successful application of the emulsion in accordance with my invention. The emulsion thus should be tailored for each specific application. Oil-in-water emulsions of the type contemplated herein are readily prepared from certain crude oils. For example, some asphaltic crudes contain sufficient natural emulsifiers to form oil-in-water emulsions by the addition of dilute solutions of alkali metal hydroxide, such as sodium, potassium, or lithium hydroxides. It has been shown that in at least one asphaltic crude oil the constituents producing the low interfacial tension necessary for emulsification are predominantly carboxylic acid-type compounds. The viscosity, which is influenced largely by the water content, is not critical in the application of this process. Extremely viscous solutions should be avoided, however, because of injectivity problems that could arise.

Crude oils that do not contain sufficient organic acids to produce emulsification upon the addition of sodium hydroxide can be emulsified by adding a synthetic surfactant. A synthetic surfactant may be required if the emulsion is to be prepared in saline water which is present in many formations. Examples of such surfactants are the 8 mol ethylene oxide adduct of nonyl phenol, ethylene oxide adducts of polyoxypropylene and polyoxyethylated $C_{16}$ to $C_{18}$ fatty alcohols, and petroleum sulfonates.

Because crude oils contain varying amounts of surface active materials, varying amounts of caustic solution will be needed to produce stable oil-in-water emulsions. The range of acidic components in typical crude oils is such that the required concentration range of sodium hydroxide in the water phase to produce a stable 70 percent oil-in-water emulsion may vary from about 0.05 to about 1.0 weight percent. Sodium hydroxide concentrations outside of those just mentioned do not seem to produce stable emulsions. Too little caustic does not sufficiently neutralize the organic acids to produce adequate emulsification, whereas too much sodium hydroxide produces a water-in-oil emulsion with a viscosity as high as or higher than the crude oil from which it was prepared.

For a given quantity of oil, an emulsion having droplet diameters slightly larger than the pore constrictions gives the greatest restriction to fluid flow. Droplet size can be varied in two ways. One is to use different crude oils. With different crude oils, the diameter of the droplet produced when caustic is added to the crude may vary in size ranging from 1 to about 20 microns. Emulsion droplet sizes and size distributions for a given oil can also be varied by changing the amount of caustic in the aqueous phase. Thus, increasing the sodium hydroxide concentration in the aqueous phase neutralizes greater quantities of interfacially active acids in the crude oil and produces emulsions with smaller droplet diameters. It has been found that stability is considerably lower for the 0.1 percent and 0.2 percent sodium hydroxide-prepared emulsions, i.e., within the emulsification range, lower concentrations of sodium hydroxide produce lower stability emulsions. Where synthetic surfactants are employed, the salinity of the water can be adjusted to control the emulsion size droplets.

The composition of the emulsion employed may vary rather widely, the principal requirement being that it is an oil-in-water system. Generally, it should contain from about 1 percent to about 30 percent oil and may be injected in amounts sufficient to penetrate from about 2-30 percent, typically 10-20 percent of the inter-well pore volume.

DESCRIPTION OF DRAWINGS AND A SPECIFIC EMBODIMENT OF THE INVENTION

Figure 2:
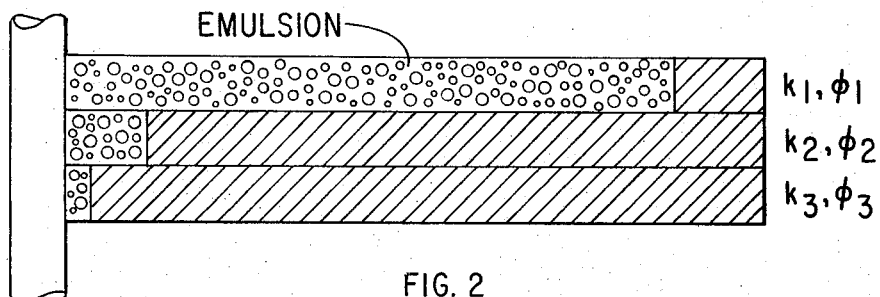
Figure 3:
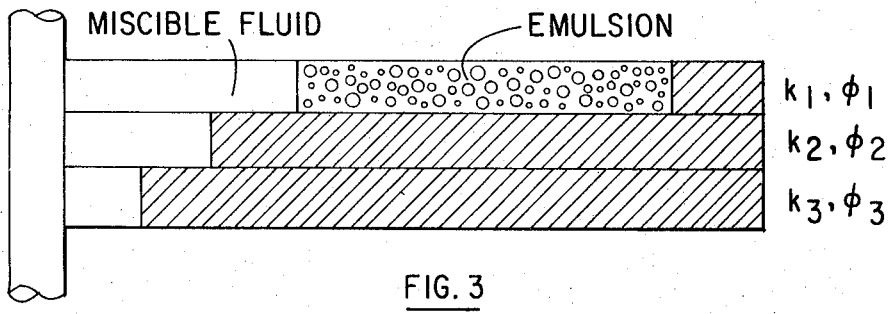

My invention is further illustrated by the accompanying drawings in which:

FIG. 1 represents a cross section of a formation of varying permeability and porosity after injection of water in a waterflooding operation, FIG. 2 is a cross section of a formation similar to that shown in FIG. 1 after injection of an oil-in-water emulsion showing flow of the emulsion into the more permeable zones, and FIG. 3 illustrates a formation that has been treated as shown in FIG. 2 followed and displaced by a miscible fluid.

In all of the above figures, the permeability and porosity of each of the zones shown vary as indicated by the legend below FIG. 3. Thus, in FIG. 1, it is seen that water has penetrated approximately 40 percent of the most permeable zone and lesser but substantial amounts of the other two less permeable sections. This is in accordance with variations in permeability of the three zones involved.

In FIG. 2, the emulsion has invaded a substantially higher percentage of the more permeable section than the water in FIG. 1 because the droplet size of the dispersed phase in the emulsion more closely approximates the pore diameter of the more permeable section. Standard laboratory tests, such as mercury injection, can be made on cores from the native formation to determine pore sizes. In the other two sections shown in FIG. 2, it will be noted that the emulsion has penetrated to a substantially lesser extent than the water in FIG. 1.

FIG. 3 illustrates the increased overall sweep efficiency that can be realized by the use of my invention. Thus, the miscible fluid (solvent) not only displaces the emulsion in the more permeable section, but drives the portion of the emulsion in the less permeable zones as well. The miscible fluid displaces the emulsion and also the native oil saturation. As the miscible fluid is injected, the fraction of the emulsion present in the highly permeable section is increased, thus permitting a greater portion of the injected fluids to enter the less permeable zones.

From the foregoing description, it is evident that the process of my invention can be used to increase the sweep efficiency of the solvent in any type of miscible flooding operation and to, in turn, increase the recovery of oil by such operation. For example, my invention is applicable to the process described in Murphree et al., U.S. Pat. No. 3,256,933, in which the front end of the solvent slug is miscible with the oil while the trailing edge of the slug is immiscible with the drive agent.

I claim:

1. In a method for the recovery of crude oil from an underground deposit thereof by a miscible flooding process and wherein such deposit exhibits a substantial degree of reservoir heterogeneity insofar as concerns the permeability and porosity thereof, said deposit being penetrated by an injection well and a production well, the improvement comprising:
   1. introducing via said injection well an oil-in-water emulsion in which the diameter of the dispersed phase droplets is approximately the same as the diameter of the pores in the more permeable portion of said deposit whereby said emulsion primarily penetrates said more permeable portion;
   2. injecting a micellar solution via said injection well into said deposit; and
   3. displacing said solution toward said producing well to recover crude oil therefrom.

2. The method of claim 1 in which the emulsion is a crude oil-in-water emulsion wherein the diameter of dispersed phase droplets ranges from about 1 to about 20 microns.

3. The method of claim 2 wherein the amount of emulsion employed corresponds to from about 2 to about 30 percent of the interwell pore volume.

4. The method of claim 1 wherein said solvent is displaced through said deposit by means of water.

5. The method of claim 1 wherein the oil content of said emulsion ranges from about 1 to about 20 percent.

6. The method of claim 1 wherein the viscosity of the solvent employed is greater than that of water.

* * * * *